Oct. 8, 1940.  J. A. EDEN  2,217,335
MEANS AND PROCESS OF MAKING CONTAINERS
Filed March 18, 1936  7 Sheets-Sheet 1
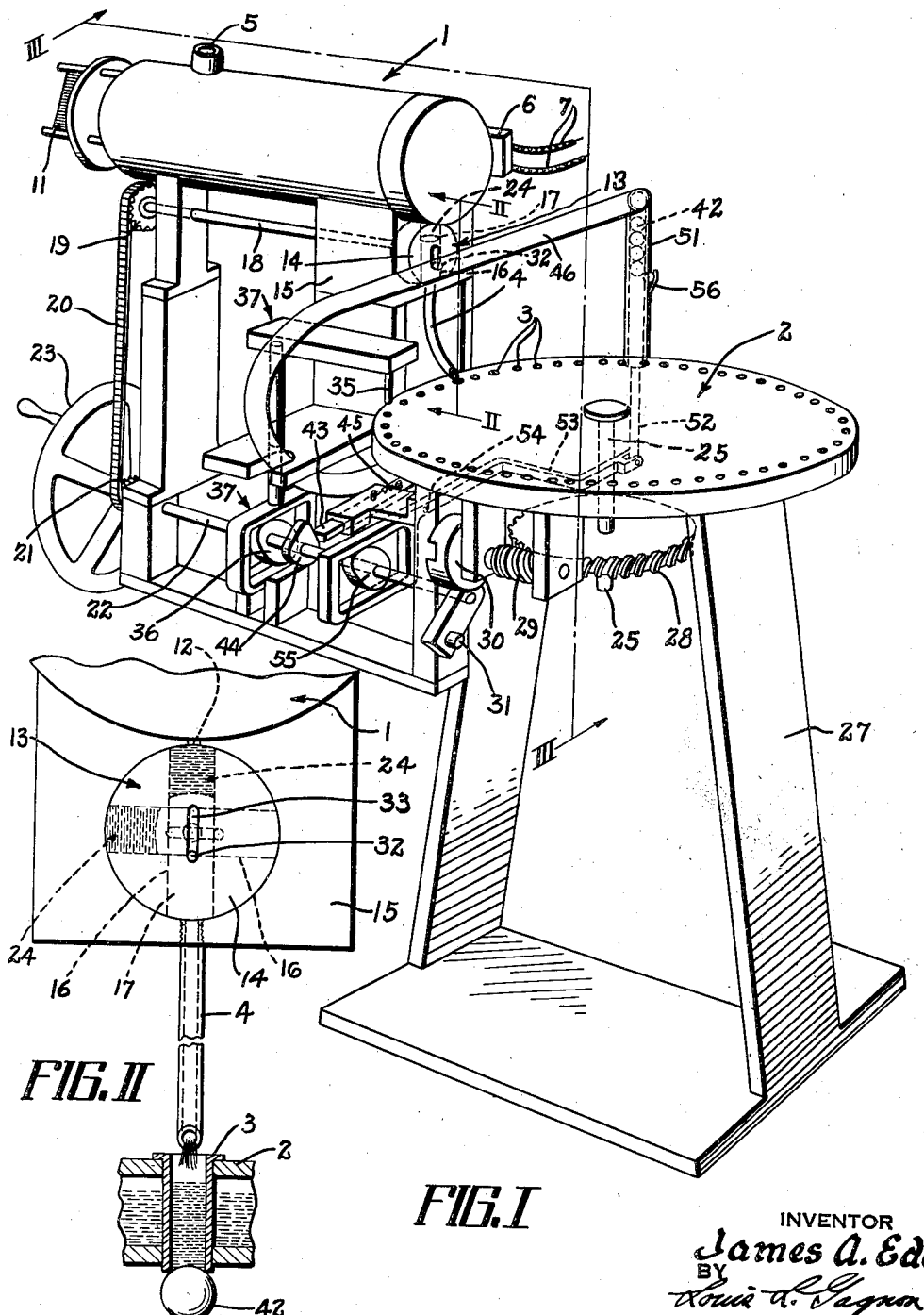
INVENTOR
James A. Eden.
BY
ATTORNEY Oct. 8, 1940.         J. A. EDEN         2,217,335
MEANS AND PROCESS OF MAKING CONTAINERS
Filed March 18, 1936         7 Sheets-Sheet 2
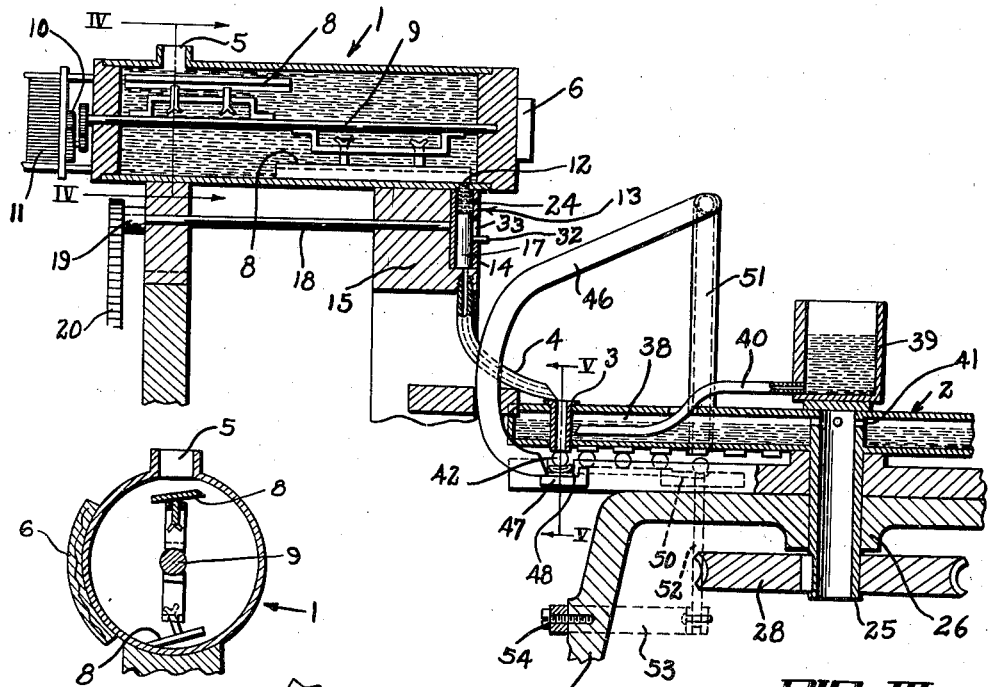
FIG. III
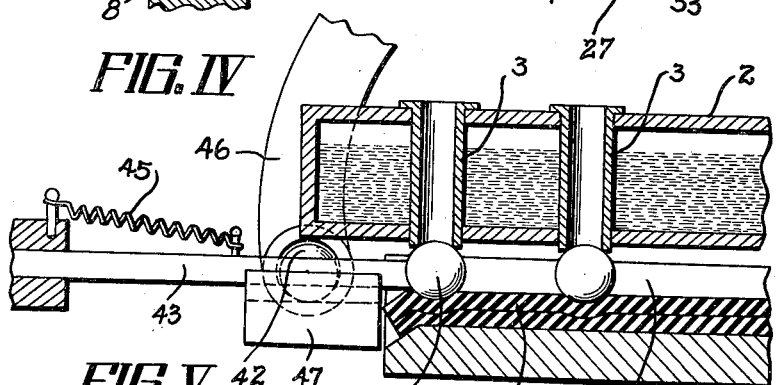
FIG. IV
FIG. V
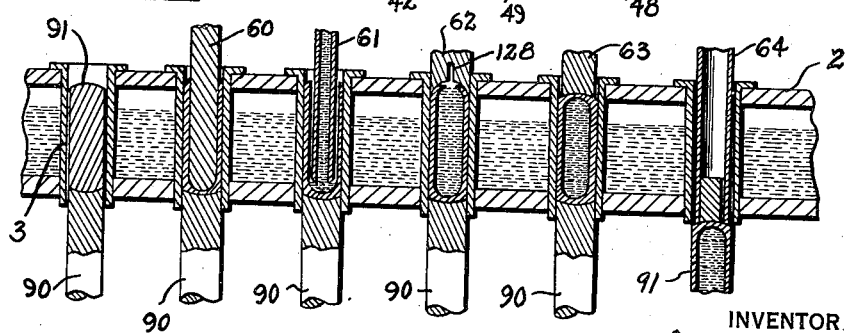
FIG. XVIII
INVENTOR
James A. Eden.
BY
ATTORNEY

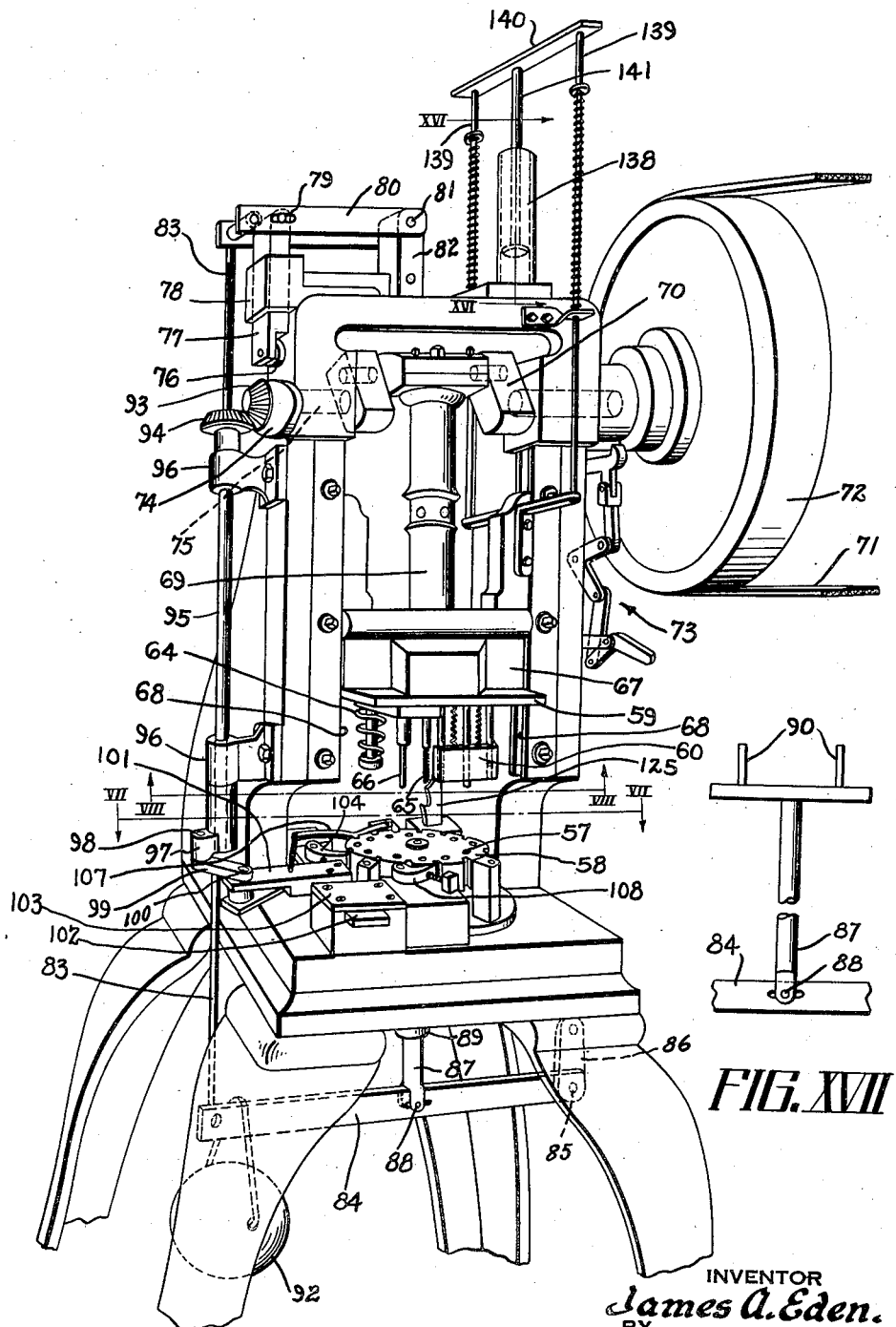

Oct. 8, 1940.  J. A. EDEN  2,217,335
MEANS AND PROCESS OF MAKING CONTAINERS
Filed March 18, 1936  7 Sheets-Sheet 4
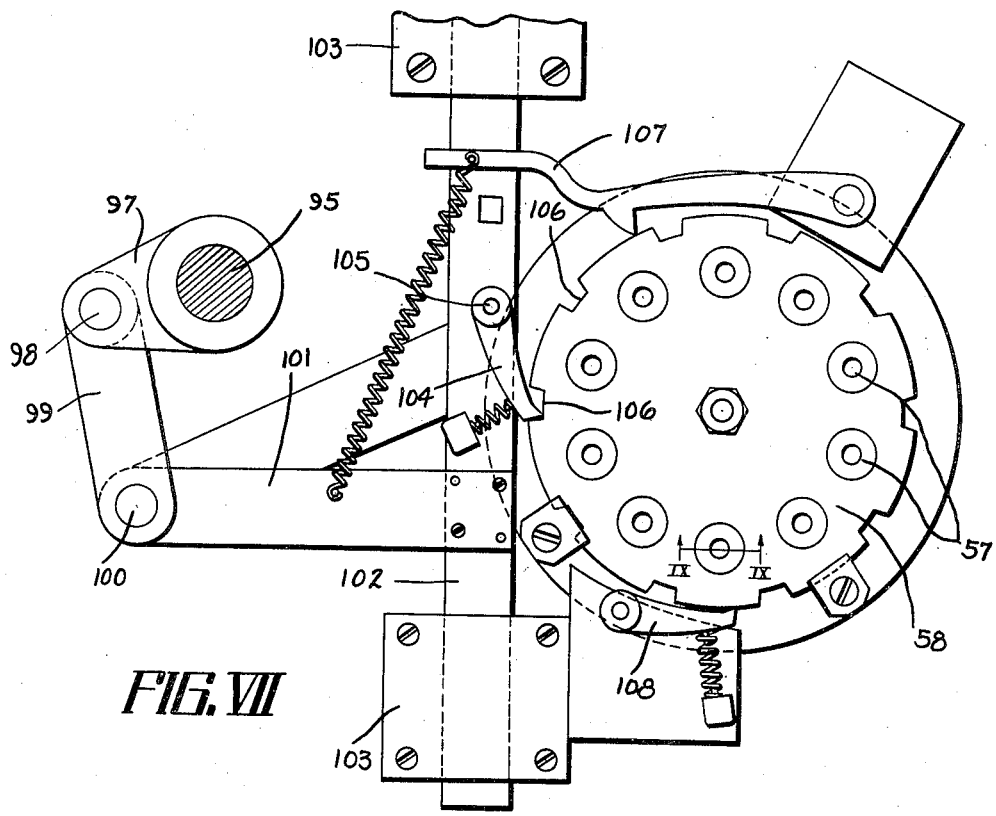
FIG. VII
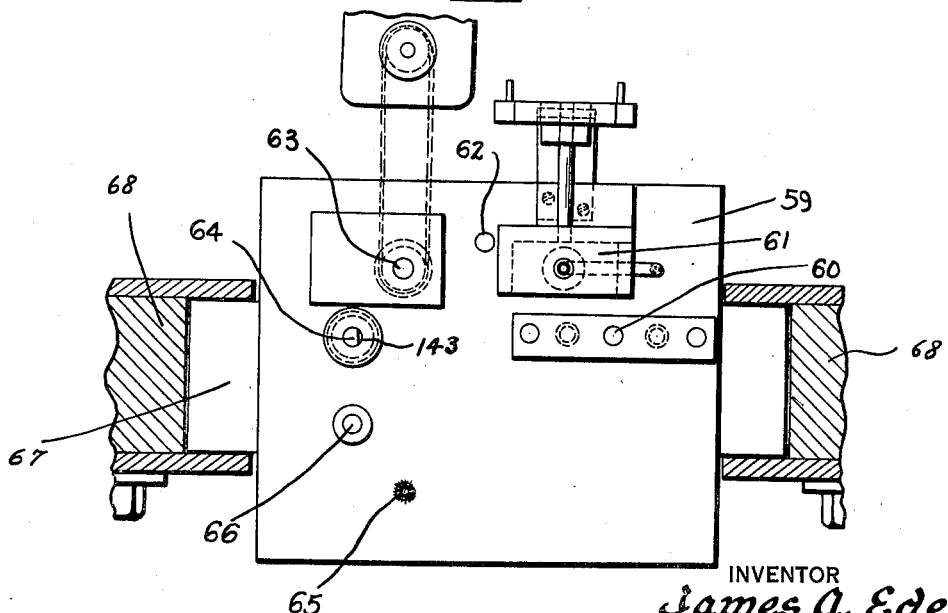
FIG. VIII
INVENTOR
James A. Eden.
BY
Louis L. Gagnon
ATTORNEY Oct. 8, 1940.         J. A. EDEN         2,217,335
MEANS AND PROCESS OF MAKING CONTAINERS
Filed March 18, 1936         7 Sheets-Sheet 5
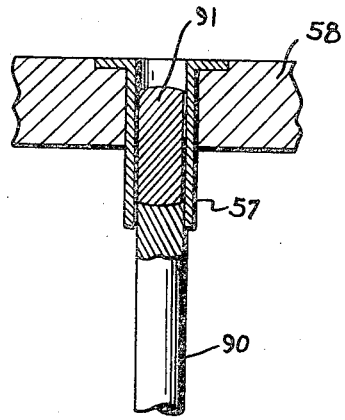
FIG. IX
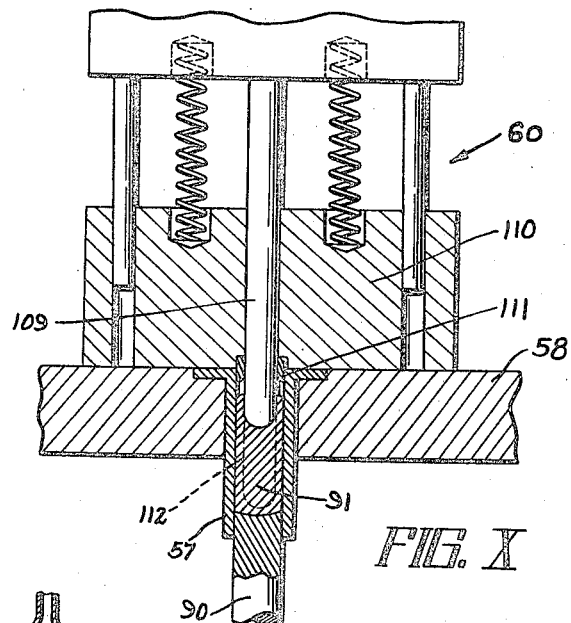
FIG. X
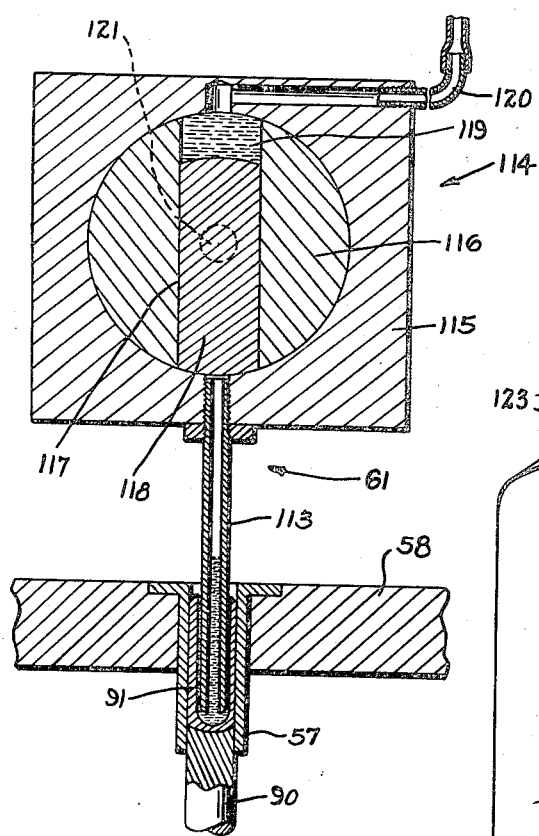
FIG. XI
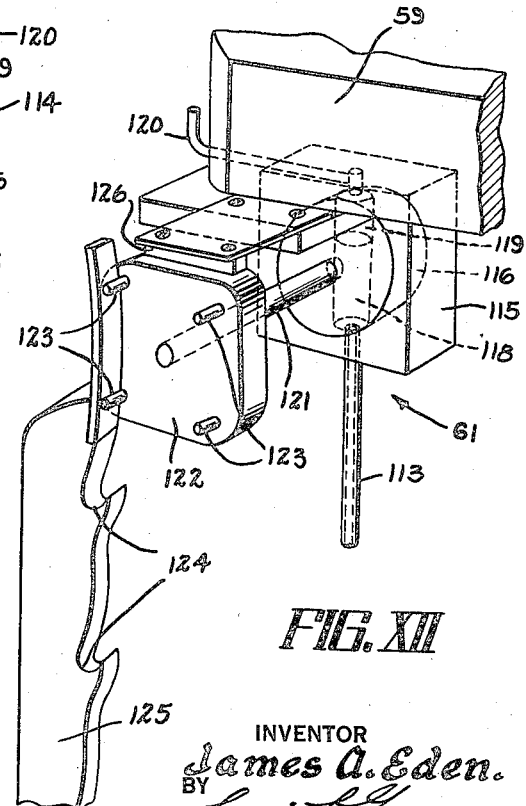
FIG. XII
INVENTOR
James A. Eden
BY
Louis L. Gagnon
ATTORNEY

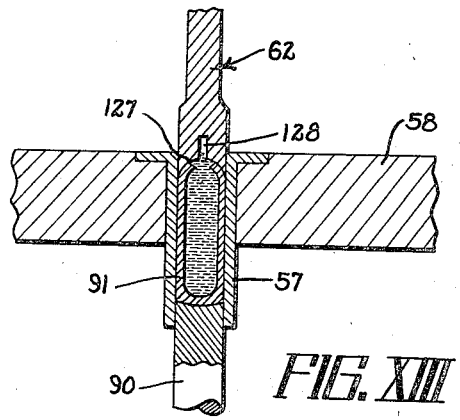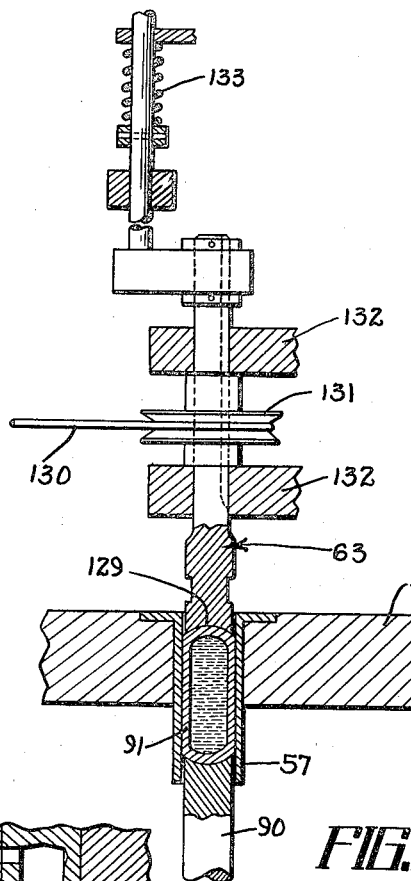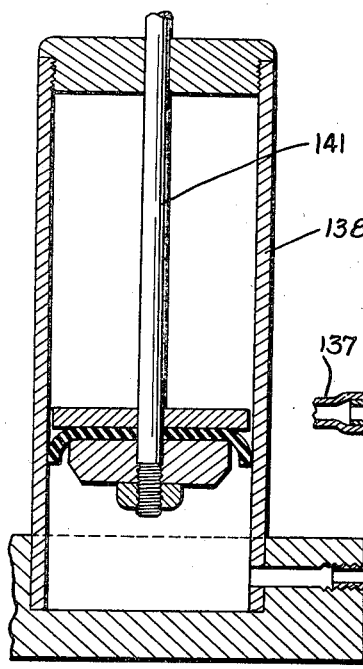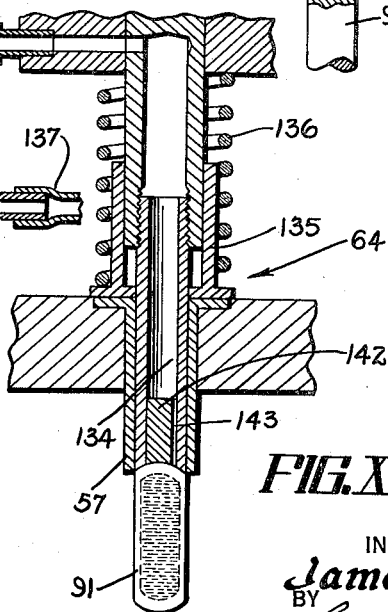

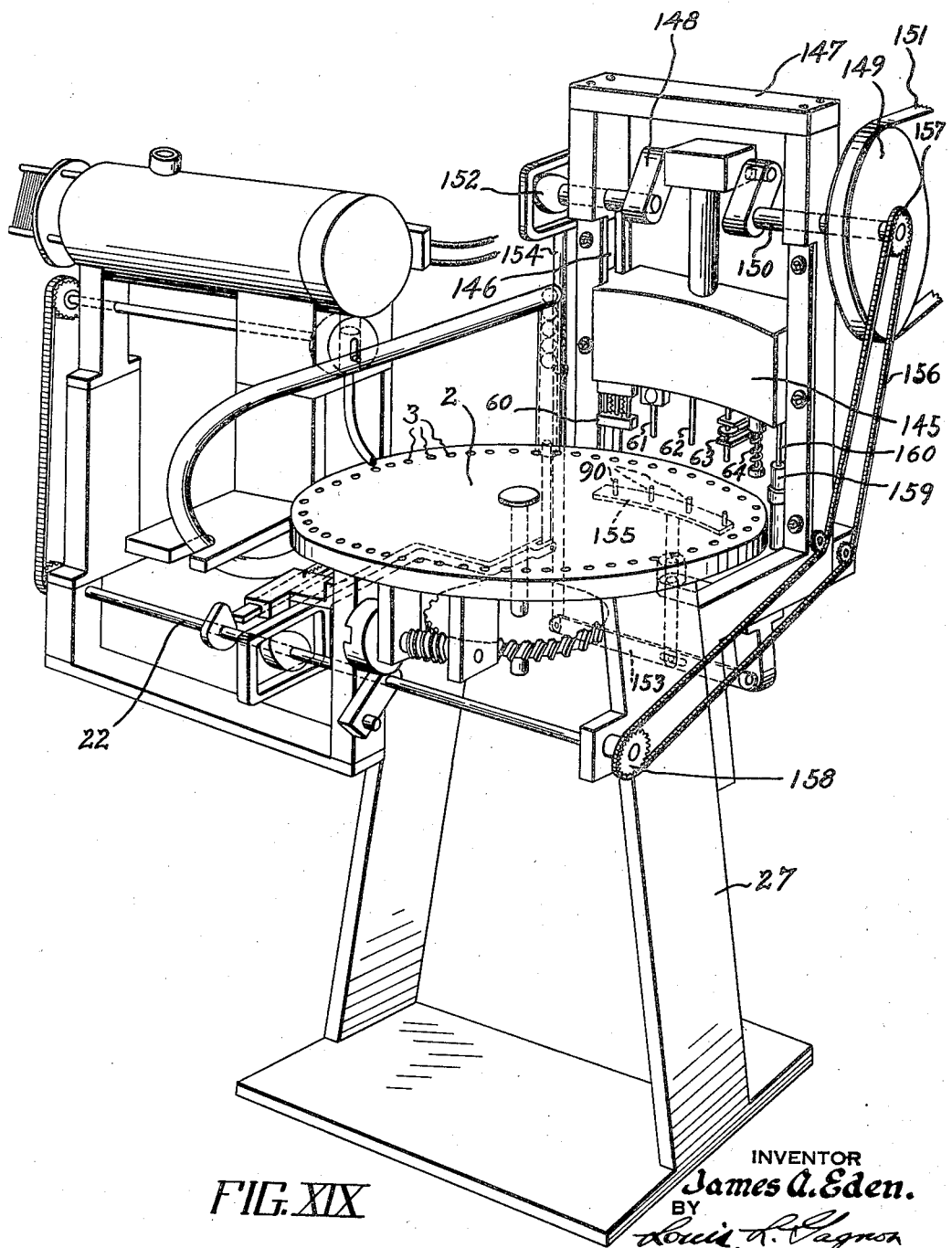
FIG. XIX

Patented Oct. 8, 1940

2,217,335

UNITED STATES PATENT OFFICE 2,217,335

MEANS AND PROCESS OF MAKING CONTAINERS

James A. Eden, Springfield, Mass., assignor to Elmer L. Schumacher, Southbridge, Mass.

Application March 18, 1936, Serial No. 69,533

10 Claims. (Cl. 18—1)

This invention relates to novel means and process of making containers and to further means and steps of the process including the filling and closing of said containers to seal the fillings therein.

One of the principal objects of the invention is to provide novel means and process of making containers in combination with means for performing further steps of the process including filling and closing said containers to seal the filling therein.

Another object of the invention is to provide simple, efficient and economical mechanical means for performing each of the steps of the process.

Another object is to provide automatically functioning means for performing most of the steps of the process of manufacture.

Another object is to provide novel means and process whereby a molten solution of a composition having a paraffin base may be cast or molded and/or mechanically formed into containers of the character described.

Another object is to provide novel means and method of forming a slug of a paraffin composition or a composition having similar characteristics producing one of the steps of the process of manufacture.

Another object is to provide novel means and method of hollowing out the slug to form a cup shaped member producing another step of the process of manufacture.

Another object is to provide novel means and method of measuring a predetermined amount of liquid and of depositing said liquid in said cup shaped member whereby another step of the operation is performed.

Another object is to provide novel means and method of integrally closing the container to hermetically seal the liquid therein whereby the final step of the operation is performed.

Another object is to provide novel means and method of ejecting the finished article from the machine.

Another object is to provide a novel construction of machine utilized in casting the slugs wherein parts of the casting means are automatically assembled and separated during the operation of the machine.

Other objects and advantages of the invention will become apparent from the following description taken in connection with the accompanying drawings and it will be apparent that many changes may be made in the details of construction, arrangement of parts, and steps of the process shown and described without departing from the spirit of the invention as expressed in the accompanying claims. I, therefore, do not wish to be limited to the exact details of construction and steps of the process shown and described as the preferred forms only have been shown and described by way of illustration.

This invention as referred to in the above objects is directed broadly to novel means and method of forming, filling and sealing containers and resides primarily in first casting a slug of pliable composition containing chalk and having a paraffin base to substantially the size and shape of the desired container, hollowing out the slug to form a cup shaped member while substantially maintaining the shape thereof, filling the cup shaped member with a desired filling and then sealing the open end of the cup shaped member by integrally joining the composition at said end to seal the filling therein. The gist of the invention is to provide a container whose walls, when completed, will all be integrally joined and during use, will be relatively rigid but free to expand and contract within reasonable limits, and which upon the application of heat of a controlled temperature may be rendered plastic, pliable and workable into an integral mass.

Another desired feature of the invention is to provide a container of the above character whose composition is such that it will not readily mix with the filling therein if and when the said container is rendered plastic and pliable.

Another object is to provide a container which is of such a nature that it may be broken into by biting and which may be rendered plastic and chewable if desired.

Referring to the drawings:

Fig. I is a perspective view of a machine embodying the invention and used in performing one of the steps of the process of manufacture;

Fig. II is an enlarged fragmentary sectional view taken on line II—II of Fig. I, looking in the direction indicated by the arrows;

Fig. III is a fragmentary sectional view taken as on line III—III of Fig. I, looking in the direction indicated by the arrows and showing an additional attachment for cooling the casting tubes;

Fig. IV is a sectional view taken on line IV—IV of Fig. III;

Fig. V is an enlarged fragmentary sectional view taken on line V—V of Fig. III;

Fig. VI is a perspective view of another machine embodying the invention and used in performing other steps of the process of manufacture;

Fig. VII is an enlarged plan view of the die bed and its operating mechanism looking as in the direction indicated by the arrows VII—VII in Fig. VI;

Fig. VIII is an enlarged sectional view of the machine head taken as on line VIII—VIII of Fig. VI and looking in the direction indicated by the arrows;

Fig. IX is an enlarged fragmentary sectional view through one of the slug retaining members of the machine bed taken as on line IX—IX of Fig. VII, showing a slug in the retaining member and illustrating a step in the process of manufacture;

Fig. X is a view similar to Fig. IX showing another step in the process of manufacture;

Fig. XI is a view similar to Fig. IX showing another step in the process of manufacture;

Fig. XII is a rear perspective view of the liquid feeder used in the step of the process shown in Fig. XI;

Fig. XIII is a view similar to Fig. IX illustrating another step in the process of manufacture;

Fig. XIV is a similar view illustrating a further step in the process of manufacture;

Fig. XV is a similar view showing the means for ejecting the completed article from the machine bed of the machine;

Fig. XVI is an enlarged sectional view taken on line XVI—XVI of Fig. VI;

Fig. XVII is a detail view of the means for supporting the slugs in the holding members of the machine bed during the performing of the various operations thereon;

Fig. XVIII is a diagrammatic sectional view illustrating the successive steps of the process of manufacture; and Fig. XIX is a view similar to Fig. I illustrating diagrammatically a complete mechanical device for accomplishing all of the features of the invention.

Referring to the drawings and more particularly to Fig. XVIII, the method broadly comprises the provision of a plurality of casting tubes 3 which are successively advanced and filled with liquid paraffin composition to form the slugs 91. The slugs 91 are successively advanced and hollowed out by means of a reciprocating plunger 60 to form cup shaped members. The respective cup shaped members are advanced into alignment with a liquid or other desired filling measuring device 61 and are filled with said filling. The said filled cup like members are then successively advanced into alignment with end closing and sealing tools 62 and 63 which seal the filling in the cup shaped members and complete the device. A suitable ejecting tool 64 forces the completed devices from the casting tubes as they are advanced from the end sealing means 63.

Referring more particularly to the drawings wherein like characters of reference designate like parts throughout the several views, the machine illustrated in Figures I to V inclusive is adapted to form the slugs 91 of a composition having a paraffin base and from which a desired container, capsule or the like may be formed of the type and nature set forth in detail in Patent No. 2,004,957, issued June 18, 1935 to A. J. Messner. This machine comprises broadly a tank 1 in which the paraffin composition is to be melted, a rotary table 2 having a plurality of casting tubes 3 for shaping the slugs from the molten paraffin composition, and a pipe line 4 for directing the molten paraffin composition from the tank to the casting tubes.

The tank 1 is in the form of a hollow cylinder having a restricted mouth portion 5 through which the paraffin composition may be placed in said tank. The tank is provided with suitable heat generating means such as an electrical heating coil 6 connected by the lead wires 7 to a suitable source of electrical energy whereby the said tank may be heated to melt the paraffin. The heating coil 6 is preferably provided with a thermostat control, not shown, for automatically turning on and shutting off the electrical energy when the temperature of the tank increases or decreases beyond a desired degree.

It will be noted by reference to the Messner Patent No. 2,004,957, referred to above, that the paraffin composition contains a large percentage of powdered chalk or other means and due to this fact the molten composition in the tank 1 must be continually agitated to maintain the mixture at the proper consistency. To accomplish this result the tank 1 is provided internally with a plurality of agitators 8 mounted on a shaft 9 which is rotated through a set of reduction gears 10 by a motor 11.

The molten paraffin composition is adapted, during the operation of the machine, to flow through an outlet 12 in the bottom of the tank 1 into a measuring valve 13 supported beneath the tank. This measuring valve is in the form of a disc 14 rotatably mounted in a supporting block 15. The disc 14 is provided with a transverse opening 16 in which a plunger 17 is mounted to reciprocate when the disc 14 is rotated. This plunger 17 is made shorter than the length of the opening 16 to provide a chamber 24 in the disc for receiving the liquid. The length of the plunger controls the size of the chamber and provides means for measuring the amount of liquid paraffin to be conveyed to the pipe line 4 and from said pipe line into the casting tubes 3. The discs 14 is mounted on the end of a shaft 18 which is rotated by a toothed sprocket 19 and chain 20. The chain is connected to a suitable sprocket 21 carried by a shaft 22. The shaft is rotated by the source of power 23 by which the machine is operated. This source of power is illustrated as being a manually operated hand wheel but it is to be understood that it can be in the form of an electric motor or any other suitable means. When the disc 14 is rotated, as shown in Fig. II, it causes the chamber 24 to move from its position beneath the outlet 12 to a position in alignment with the pipe line 4, at which position the plunger 17 drops under the action of gravity and forces the liquid paraffin in said chamber through the pipe line. As the plunger 17 drops, the molten paraffin flows into a newly formed chamber adjacent the end of the plunger towards the outlet 12, ready for the next successive rotating of the disc 14. During the rotation of the disc 14 its solid side wall moves over the outlet 12 and prevents the flow of liquid paraffin therethrough until the opening 16 is again moved into alignment with said outlet. Continued rotation of the disc 14 causes successive and intermittent measured discharges of the liquid paraffin to be emitted by the pipe line 4. During said successive and intermittent discharges the casting tubes 3 in the table 2 are also intermittently and successively aligned with the end of the pipe line 4 and in this manner each tube successively receives a measured amount of liquid paraffin. The plunger 17 is provided with a pin 32 which extends outwardly of the slot 33 formed in the face of the disc 14 to provide means by which the plunger may be manually operated if desired and to provide means for preventing its rotating during use.

In order to insure that the accurate amount of paraffin is measured and delivered to the casting tubes 3, great care is taken that no air gets into the mixture or into the measuring valve 13. It will be noted that as the plunger 17 drops a vacuum is formed in the chamber 24 which causes the liquid paraffin to be sucked from the tank 1 into said chamber. In this manner no air enters the chamber.

The table 2 is supported by a hollow shaft 25 mounted to rotate in suitable bearing means 26 formed in the top portion of the base 27 of the machine. The shaft 25 is rotated by suitable gearings 28 and 29 intermittently driven by a ratchet-like member 30 moved intermittently by a pawl-like member 31 attached to the end of the shaft 22 and rotated thereby. The intermittent movement imparted to the table 2 is so controlled as to successively align the casting tubes 3 with the end of the pipe line 4 just previous to the liquid paraffin discharges from said pipe line, that is, the discharges are so timed as to occur only during the period of dwell between the successive advancements of the tubes. During the continued successive advancing of the tubes the paraffin in said tubes is adapted to harden while in its normal state or under ordinary atmospheric pressure, that is, no mechanical compression or other means is used to shape the paraffin in the tubes. When sufficiently hard the paraffin is eventually ejected in the form of a pin-like slug. The ejecting operation is performed by a plunger 35 which is reciprocated by a cam 36 mounted on the shaft 22. The cam 36 is rotated by the shaft 22 and causes a bracket 37 supporting the plunger 35 to move up and down and causes the plunger to move into and out of the tubes 3 as they are intermittently aligned therewith. This operation takes place at each advancing movement of the table.

To aid the cooling and hardening of the paraffin in the tubes 3 the table 2 is formed with a hollow chamber 38 through which the tubes 3 extend. The said chamber is adapted to be filled with cold water or other suitable means which flows about the tubes and chills them. The water is directed from a tank 39 into the chamber 38 through feed pipes 40 and is adapted to drain off through overflow openings 41 formed in the hollow shaft 25.

Attention is directed particularly to the construction of the casting tubes 3. It will be noted that the tubes are made cylindrical so that the slugs can be ejected therefrom and that the liquid paraffin is held in said tubes by balls 42 which are pressed into alignment with the inner ends of the tubes as they are intermittently advanced. These balls 42 are adapted to form a bottom for each tube 3 and are fed beneath the tubes by a reciprocating plunger 43 operated by a cam 44 carried by the shaft 22. The plunger is advanced by the cam 44 to press the balls beneath the tubes 3, as shown in Fig. V, and is moved back by a spring 45. As the plunger recedes a ball 42 is fed down through a pipe line 46 onto a receiving table 47 and is pressed from said table beneath a tube 3 by the forward movement of the plunger 43. The balls are adapted to remain in alignment with the tubes 3 and travel with said tubes in a raceway 48 formed beneath the table 2. To aid in maintaining the balls in constant engagement with the tubes the raceway 48 is provided with a lining 49 of resilient means such as rubber. As the balls reach the opposite end of the raceway they drop off onto a receiving table 50 and are pressed upwardly of a feed pipe 51 by a reciprocating plunger 52. The plunger 52 is reciprocated by a lever 53 pivoted at 54 to the base 27 and which is moved about said pivot by a cam 55 mounted on the shaft 22. As the cam rotates the lever is rocked on its pivot and causes the plunger 52 to push the ball from the table 50 upwardly of the pipe 51. The balls are adapted to be pushed upwardly past a spring pressed ball type stop 56 formed on the side of the pipe 51 so that the balls 42 won't drop back when the plunger 52 is withdrawn from the feed pipe. Continued forcing of the balls upwardly of the pipe 51 causes them to drop into the pipe line 46 where they will be carried back to the receiving table 50. It is to be understood that an endless ball chain might be substituted for the loose ball arrangement, if desired, only in this instance the pipe lines 46 and 51 would be eliminated and the chain would be allowed to hang under the table in a manner enabling it to travel from one side to the other of the raceway 48.

The operation of the machine is substantially as follows:

The composition having a paraffin base and containing powdered chalk is placed in the tank 1 and the heating unit 6 is turned on to heat and melt the paraffin. When the paraffin has become molten the motor 10 is turned on to agitate the composition to mix the chalk with the paraffin. Power is then applied at 23 to rotate the shaft 22 whereby the shaft 18 will be rotated to cause the measuring valve 14 to rotate and discharge a measured amount of the paraffin composition into the pipe 4 and into the tube 3 aligned with said pipe. Immediately after the discharge of the paraffin composition takes place the pawl and cam mechanism 30 and 31 move into engagement with each other and, through the gears 28 and 29, turn the table 2 an amount equal to the distance between the casting tubes 3 whereby another casting tube will be aligned with the end of the pipe 4. The pawl and cam then disengage and the table 2 remains in this position until the cam and pawl are again engaged. During the time that the table 2 is being advanced the measuring valve 14 is aligned with the outlet 12 of the tank 1 and is refilled with the paraffin composition. Continued operation of the machine causes the valve 14 again to turn and deposit the paraffin composition into the pipe 4 and from said pipe into the aligned tube 3. This function is continuous during the operation of the machine. It is specifically pointed out that during the rotation of the shaft 22 the cam 55 is rotated and is adapted to engage and rock the lever 53 about its pivot 54. This rocking movement causes the plunger 52 to move upwardly into the feed pipe 51 and simultaneously force the ball members 42, fed from the raceway 48 onto the receiving table 50, upwardly of said feed pipe. Continued operation of this type causes the balls to eventually drop into the pipe line 46 and be carried back to the receiving table 47. The balls are adapted to be forced from the table 47 beneath the inner ends of the casting tubes 3 to form bottoms for said tubes. This operation is performed by the plunger 43 which is reciprocated by the action of the cam 44 and spring 45. The plunger 43 is adapted to recede at the completion of each operation an amount sufficient to allow another ball 42 to be fed onto the receiving table 47 whereupon the operation of forcing the ball beneath the next tube is repeated. It is specifically pointed out that the first mentioned receiving table 50 is angled slightly towards a pocket formed adjacent the end of the plunger 52 to cause the balls to properly align with said end as they drop off the raceway 48 onto said table 50. During the operation of the machine a cam 36 also carried by the shaft 22 moves the ejecting plunger 35 into and out of the advanced tubes 3 to force the completed slugs of paraffin composition out of said tubes into a suitable receiver, not shown. It is to be understood that all of the different working parts set forth above perform their specific operations in timed relation so that the casting of the slugs of paraffin composition are formed autmatically and continuously. The slug is shown at 91 in Fig. IX.

The slugs are next placed in the holding bushings 57 of a rotary bed plate 58 of another automatically operating machine, such as shown in Fig. VI, wherein various successive operations are performed thereon, as shown in Figures IX to XV inclusive, to complete the articles being formed.

The machine shown in perspective in Fig. VI and in detail throughout Figures VII to XVIII of the drawings comprises a tool head 59, which as shown in Fig. VIII, carries a plurality of tools 60, 61, 62, 63, 64 and 65 and an aligning pin 66, all of which are adapted to be moved into and out of the aligned holding bushings 57 by movement of the tool head towards and away from the bed plate 58. These various tools perform different steps of the process which will be described in detail hereinafter.

The tool head 59 is carried by a slide 67 slidably mounted in spaced slideways 68. The slide 67 is connected by a link 69 to a crank 70. The said crank is rotated by the belt 71 and pulley 72 and is adapted to move the tool head 59 towards and away from the bed plate 58. Suitable latch and ratchet means, such as shown at 73, control the starting and stopping of the rotation of the pulley. A cam member 74 connected to a pivot shaft 75 of the crank 70 is, during each rotation of the shaft, adapted to engage a roll 76 pivoted to the end of a slide 77 mounted in a vertical slideway 78 adjacent the top of the machine. The slide 77 is pivoted at 79 to a lever 80 which is itself pivoted at 81 adjacent one of its ends to a support 82. The lever 80 has a link rod 83 pivotally attached thereto adjacent its opposite end which is adapted to be raised and lowered by the lever at each rotation of the cam 74. The link rod 83 is attached adjacent its lower end to a lever 84 and is adapted to raise and lower said lever. The lever 84 is pivoted at 85 adjacent its opposite end to a support 86 and has a rod 87 attached thereto as indicated at 88. The rod 87 is mounted in a vertical bearing 89 and carries a plurality of vertical pins 90 which are adapted to be moved into and out of the holding bushings 87 on the under sides thereof. These pins 90 form backing supports for the slugs 91, carried by the said bushings, during the performing of the various operations thereon. A weight or other suitable means 92 is used to lower the lever 84 as the cam 74 disengages the roll 76. Other means such as a spring might also be employed to accomplish the same result.

A bevel gear 93 attached to the shaft 75 adjacent the cam 74 is also adapted to be rotated by said shaft during the rotation of the cam. This gear is in constant mesh with a bevel gear 94 attached to the upper end of a shaft 95. The shaft 95 is mounted in spaced bearings 96 and has a crank member 97 attached thereto adjacent its lower end. The crank is connected at 98 to a link 99 which in turn is connected at 100 to a bracket 101 carried by a slide 102, see Figs. VI and VII. The crank is rotated by the gears 93 and 94 and is adapted to cause the slide 102 to reciprocate in the spaced slideways 103. As the slide 102 moves in one direction a spring pressed pawl 104 pivotally attached to the slide, as indicated at 105, is adapted to engage with one of a plurality of notches 106 formed in the periphery of the rotary bed plate 58 and causes said bed plate to rotate an amount equal to the distance between the respective holding bushings 57. The slide then moves in the opposite direction a distance sufficient to engage with another notch whereupon reversed movement of the slide causes the bed plate to be again advanced the predetermined amount. This causes the various holding bushings to be successively aligned with each of the tools carried by the tool head 59. Suitable spring controlled pawls 107 and 108 limit the movement of the plate 58 and act as means for holding the plate in adjusted position after each advancement. This operation carries the slugs 91 fed into the rotary bed plate during the operation of the machine into alignment with each of the tools carried by the tool head 59.

The first tool 60 which, as shown in Figs. VIII and X, is adapted to form an opening to a predetermined depth in the slugs 91 as they are successively aligned therewith. This tool comprises a plunger 109, a spring pressed stripping block 110 and an end forming tool 111. When the tool head 59 is moved downwardly by the crank 70 the stripper block first engages with the bed plate 58 and continued downward movement forces the plunger 109 into the paraffin slug 91 to form an opening therein as indicated by the dotted lines 112. As the plunger is pressed into the slug the paraffin composition from which the slug is formed creeps upwardly of the sides of the plunger and engages the end forming tool 111. This tool bevels the end to an angle of about 45° to aid in performing the closing operation which is later performed. The slug, at the completion of this operation, is of a cupped shape as illustrated in Fig. XI.

The tool head 59 is then raised to retract the tool 60. During this operation the stripping block 110, into which the plunger is drawn before the block leaves the bed plate, prevents the cup shaped member adhering to the plunger and being removed from its holding bushing. The cup shaped member thus formed is then moved into alignment with the next tool 61 and a new slug 91 is simultaneously moved into alignment with the tool 60. This is brought about by the advancing movement of the bed plate 58 which takes place immediately after the tool 60 is clear of the holding bushing from which it is being withdrawn.

The tool head is then again moved downwardly to repeat the first described operation by the tool 60 and to perform the next operation by the tool 61.

The tool 61, as shown in Figs. XI and XII, has a hollow stem 113 which is moved downwardly into the cup shaped slug 91 and is provided with a liquid measuring valve 114 adapted to deposit a measured amount of liquid into the cup shaped slug through the stem 113. This measuring valve comprises a block 115 which carries the stem 113 and a disc 116 mounted to rotate in said block. The disc has a transverse opening 117 therein in which a plunger 118 is adapted to reciprocate as the disc is rotated. This plunger is shorter than the length of the opening 117 by a controlled amount to produce a liquid measuring chamber 119 into which the liquid is fed through the feed line 120 which is connected to a suitable liquid supply tank, not shown. The disc 116 is connected to a shaft 121 which in turn is connected to an indexing plate 122 having the indexing fingers 123 thereon. During the downward movement of the tool head 59, the indexing fingers are adapted to engage stop steps 124 formed on an upright 125 carried by the bed of the machine and cause the disc 116 to rotate 180°. This causes the liquid chamber 119 to be moved in a circular path into alignment with the stem 113 whereupon the plunger 118 will drop under the action of gravity and force the liquid down the stem into the cup shaped slug 91. As the plunger 118 drops, a vacuum is created which sucks the liquid into the newly formed chamber 119 ready for the next successive rotating of the disc 116. It is to be noted that as the disc 116 is rotated the solid side wall thereof moves over the inner end of the liquid feed line 120 and shuts off the flow of liquid until the plunger 118 is again aligned therewith. Suitable spring pressed stop means 126 acts as locating and retaining means for the indexing plate 122.

It is to be understood that the hollow stem 113 is so constructed and related with the cup shaped member 91 when the liquid is discharged from the measuring valve 114 that the liquid will flow or be introduced into the bottom of the cup shaped member first and will flow upwardly from the bottom and cause all of the air in said cup shaped member to be forced outwardly between the inner walls thereof and the sides of the stem.

After the above operation has been performed the tool head 59 is again raised to withdraw the tool 61 from the holding bushing 57 and cup shaped member 91 and the rotary bed plate 58 is again advanced to align the liquid filled cup shaped member with the next tool 62, shown in detail in Fig. XIII. This tool is provided with a concaved end 127 and a central opening 128 and during its movement into the holding bushing 57 is adapted to engage the tapered end of the cup shaped slug 91 and turn said end inwardly to partially close said end. Excess liquid is adapted to flow upwardly into the opening 128 so as not to interfere with the partial closing operation. The tool head 59 is again raised and the bed plate 58 rotated as previously described to advance the partially closed cup shaped member 91 to the next tool 63.

The tool 63 has a slightly concaved end 129 which is constantly rotated by the belt and pulley 130 and 131 respectively, connected to a motor or other suitable means, as the tool is fed into the holding bushing 57 and into engagement with the liquid filled cup shaped member 91 in said bushing. The tool 63 is slidably supported in spaced bearings 132 and is adapted to be forced upwardly against the compression action of a spring member 133 as it engages the end of the cup shaped member 91. This provides means whereby the tool will remain for a continued time in engagement with the end of the cup shaped member as the tool head 59 is being raised. This tool 63 is adapted to close the end of the cup shaped member and seal the liquid therein to complete the filled container or capsule.

The table is again rotated to align the completed container with the tool 64. This tool, as shown in detail in Fig. XV, is for ejecting the completed container 91 from the holding bushing and comprises a hollow plunger 134 which is adapted to be pressed into the holding bushing 57 to mechanically force the completed container out of said bushing. The plunger is mounted within a surface sealing sleeve 135 which is held into engagement with the surface of the bed plate about the holding bushing 57 by a spring member 136 and is connected by the hose line 137 to an air compression pump 138, such as shown in Figs. XVI and VI. When the tool head 59 is moved downwardly to force the plunger 134 into the holding bushing 57, a pair of spaced rods 139, connected at their lower ends to the slide 67 carrying the tool head 59 and at their opposite or upper ends to a cross member 140 connected to the plunger 141 of the pump, force the said plunger downwardly into the pump which in turn causes an air pressure internally of the hollow plunger 134 which is adapted to blow the completed liquid filled container or capsule into a suitable receiver, not shown. To aid in causing the completed container or capsule to be blown off of the end of the plunger 134, the said plunger is provided internally with a member 142 having a restricted opening 143 on the side thereof. This causes the air pressure to be directed to one side of the end of the container or capsule and causes it to be deflected sidewise off of the plunger.

It is to be understood that the various operations set forth above are to be performed simultaneously and successively during the operation of the machine. This is accomplished by continuously feeding the slugs 91 into the holding bushings 57 during the continued operation of the machine. The member 66 is merely an aligning pin which insures that the holding bushings in the bed plate are properly aligned with the various tools prior to forcing the tools into said bushings. This is accomplished by forming the aligning tool 66 longer than the remaining tools of the machine. This tool will compensate for any slight variations in alignment which might exist.

The member 65 is merely a cleansing and lubricating brush. The bushings in the space between the brush and tool 60 provide means into which the slugs 91 may be fed during the operation of the machine.

Although, for ease in description, the two machines have been shown and described separately, they may be combined into a unitary structure as shown in Fig. XIX wherein the table 2 functions in a manner similar to the rotary bed plate 58 to carry the slugs 91 cast therein successively into alignment with the respective tools 60, 61, 62, 63 and 64 which perform the various forming, filling, and sealing operations. In this particular instance the tools are carried by a reciprocating head 145 slideably mounted in the slideways 146 of a supporting frame 147 carried by the base 27 adjacent the table 2. In this instance the various tools 60, 61, 62, 63, and 64 are aligned with the successively advanced casting tubes 3 in the table 2 and are adapted to be reciprocated into and out of the tubes by the reciprocating movement of the tool head 145. The tool head 145 is moved back and forth longitudinally of the slideways 146 by a crank arrangement 148. The crank is operated by a pulley 149 mounted on the crank drive shaft 150 and driven by a belt 151 by any suitable source of power such as electric motor or other means not shown. In this instance the various slug supporting pins 90 are intermittently moved into and out of the lower ends of the casting tubes 3 by a cam 152 which operates a lever 153 through a link 154. The lever 153 raises and lowers a plate 155 on which the pins 90 are supported and in this manner moves the pins into and out of the tubes. This operation takes place at each successive and intermittent advancement of the table 2.

Instead of utilizing a separate source of power 23 the shaft 22 is driven by a chain or belt 156 connected at one end to a sprocket or pulley 157 attached to the crank drive shaft 150, driven by the belt and pulley 149 and 151, and at its opposite end to a sprocket or pulley 158 on the end of the shaft 22. The remaining parts and operation of the machine are the same as those of the machine shown in Fig. I.

The pump for creating the ejecting air pressure of the ejecting tool 64 is in this instance located beneath the tool head 145 as illustrated at 159. The plunger 160 of the pump is attached to the tool head and is forced into and out of the pump by each reciprocating movement of the head during the operation of the machine. The operation of the machine is similar to that of the combined machines shown in Figures I and VI.

It will be noted that the paraffin composition used in forming the containers is of such a nature that at a relatively low temperature it is relatively hard and will maintain its shape and at a medium temperature it may be rendered plastic and pliable and, if desired, chewable. The composition is also preferably of such a nature that it will not mix with the fillings which are carried in said containers.

Although it has been stated throughout the specification that a composition having a paraffin base is used in forming the containers or capsules, it is to be understood that any suitable composition having a mouldable nature such as the composition set forth herein and of the nature referred to in the Messner Patent No. 2,004,947, issued June 18, 1935, may be used.

It is also to be understood, particularly in instances wherein a composition having a paraffin base is used, that proper temperatures are maintained so as to permit the performing of the various operations set forth above. By this, it is meant that great care is taken that the paraffin does not harden to such an extent that it cannot be worked. These temperatures and the general characteristics of the material used are set forth in the above mentioned Messner patent.

The liquid referred to herein may be of any type set forth in the above mentioned patent or may be of any nature desired. It is also to be understood that such containers may be utilized for purposes other than liquid containers, depending upon the size thereof.

It will also be noted that during the process of sealing the liquid in the container, a small amount of the liquid is forced outwardly thereof just prior to the sealing of the end. This positively excludes the air and provides a hermetically sealed container which is of such a nature that it may expand or contract within reasonable limits during different atmospheric conditions or temperatures without danger of having the container burst open.

It is also to be understood that although the invention refers more particularly to the forming of relatively small containers, such as capsules, the invention is not limited to any particular size of container or to the use to which the said container is to be put as it is quite obvious that milk, cream, or any other liquid of this nature might be put up in containers of this kind.

The invention also applies to forming open ended containers or capsules which may be sold as separate articles of commerce. In this instance, the containers are to be filled and sealed by the dispenser who is provided with suitable means for completing the process similar to that set forth herein for filling and sealing the containers.

The method of making the open ended containers or capsules includes all of the steps of the process up to the filling and sealing thereof and is accomplished by the same mechanism merely by eliminating the said filling and sealing tools.

From the foregoing description it will be seen that simple, efficient and economical means and process have been provided for forming containers of the character described and for filling and closing said containers to seal the fillings therein.

Having described my invention I claim:

1. The process of forming a hollow and sealed container comprising forming a slug of pliable material substantially to the size and shape of the finished container desired, hollowing out the slug to form a cup shaped member, filling said cup shaped member with a liquid to be sealed therein and closing in the side walls of the cup shaped member adjacent its open end until a slight overflow of the liquid filling takes place and continuing said closing in until the material of said side walls is joined into an integral end wall to seal the filling in said container.

2. The process of forming a hollow and sealed container comprising forming a slug of pliable material with a portion thereof shaped substantially to the size and shape of the finished container desired, hollowing out the slug to form a cup shaped member, filling said cup shaped member with a filling to be sealed therein and closing in the side walls of the cup shaped member adjacent its open end until a slight discharge of the filling takes place and continuing said closing in until the material of said side walls is joined into an integral end to seal the filling in said container.

3. The process of forming a hollow and sealed container comprising confining and continually supporting a deposit of plastic material in a mold, hollowing out said material to form a cup shaped member while confined in said mold, substantially filling said cup shaped member with a filling to be sealed therein while the said cup shaped member is confined in said mold and closing in the side walls of said cup shaped member adjacent its open end until the material of said side walls is joined into an integral end wall to seal the filling in said cup shaped member while the said cup shaped member is confined in said mold, the said deposit of material being continually supported in said mold throughout the various steps of the process until the said filled and sealed container is completed.

4. The process of forming a hollow and sealed container comprising confining and continually supporting a deposit of plastic material in a mold, hollowing out said material to form a cup shaped member while confined in said mold, substantially filling said cup shaped member with a filling to be sealed therein while the said cup shaped member is confined in said mold and closing in the side walls of said cup shaped member adjacent its open end until the material of said side walls is joined into an integral end wall to seal the filling in said cup shaped member while the said cup shaped member is confined in said mold, the said closing in and joining of the side walls into an integral end wall simultaneously shaping said end wall and completing the filled container.

5. The process of forming a hollow and sealed container comprising melting a composition which is of such a nature that at relatively low temperatures it is relatively hard and at medium temperatures it is relatively plastic, depositing said molten composition into molding means of a given size and shape, allowing said composition to harden to substantially a state of plasticity, continually supporting said composition in said molding means and carrying it through the successive steps of hollowing out the center thereof to form a cup-like member, substantially filling said cup-like member with material to be sealed therein and so forcing and simultaneously shaping the side walls of the open end of the cup-like member into integral relation with each other as to seal the filling in said member and substantially complete the container to the shape and size desired while in said molding means.

6. The process of forming a hollow and sealed container comprising forming a slug of pliable material and continuously supporting said slug in a mold and carrying it through the successive steps of hollowing it out to form a cup shaped member, substantially filling said member with the material to be sealed therein and so closing and simultaneously shaping the side walls of the cup shaped member adjacent its open end until the material of said side walls is pressed into an integral end wall of a given shape to seal the filling in said container and complete the size and shape of said container.

7. In a device of the character described, the combination of a conveyor having a plurality of open ended casting members therein, means for imparting motion to said conveyor, means alignable and movable with said casting members during the movement of said conveyor for closing one end thereof throughout a portion only of the cycle of movement of said members, means associated with said conveyor for depositing a plastic composition which is to be worked on in said casting members, means also associated with said conveyor with which the casting members are aligned for hollowing out the plastic composition to a cup shaped member, additional means associated with the conveyor for substantially filling the cup shaped member when aligned therewith and means for closing in the side walls of said cup shaped member until the material of said side walls is joined into an integral end to seal the filling in said cup shaped member when the said filled cup-shaped member is aligned therewith.

8. The process of forming a hollow and sealed container comprising placing a deposit of plastic material in a holding member having substantially the shape desired of the side walls of the finished container, hollowing out said deposit to a point adjacent its lower end while in said holding member, extending a tubular-like tool into said hollowed deposit to a point adjacent the bottom thereof, flowing a filling material through said tool into said hollow deposit to cause the filling to flow upwardly from a point adjacent the bottom of the hollow deposit, withdrawing the tubular-like tool from the filled hollow deposit, closing in and shaping the open end of the hollow deposit into a solid wall to hold the filling therein and to substantially complete the sizing and shaping of said container and removing the filled container from its holding means.

9. In a device of the character described, the combination of a rotary table having a plurality of casting tubes therein, means for intermittently rotating said table an amount substantially equal to the distance between said casting tubes, a tank for holding a composition which is to be cast to a given shape by said casting tubes, a heating unit associated with said tank for rendering the composition molten, means associated with said tank and casting tubes for intermittently depositing a measured amount of said molten composition in said casting tubes at the completion of the intermittent advancing thereof, said table being of such a size and the speed of advancing thereof being such as to allow the composition to remain in said tubes until it congeals to a plastic state, means associated with said rotary table having a plurality of operating tools and mechanism for moving said tools into and out of the tubes at the completion of each intermittent advancing thereof and alignment with said tools, one of said tools being moved into the plastic composition to hollow out said composition, another of said tools being moved into the advanced and aligned hollowed out composition to a point adjacent the bottom thereof and being arranged to deposit a given amount of filling in said hollowed out composition, still another of said tools being moved into engagement with the upper open end of the filled hollow composition to close in and integrally join the material of the side walls of the composition to seal the filling therein and to substantially complete the shaping and sizing of said filled composition, and the last of said tools being aligned with the casting tube having the completed member therein and having means for ejecting said member from said casting tube.

10. In a device of the character described, means for forming a slug of a composition which is of such a nature that at a relatively low temperature it is relatively hard and at a medium temperature it is relatively plastic, means for continually supporting said slug and successively conveying it into alignment with a plurality of operating tools, one of which comprises means for hollowing out said slug to form a cup shaped member, another means for extending within and substantially filling said cup shaped member with a liquid to be sealed therein by causing the liquid to flow upwardly in said member from a point adjacent the bottom thereof, and another having means for closing the open end of the cup shaped member to seal the liquid therein and to substantially complete the sizing and shaping of said filled member, all of said means functioning automatically and successively to complete said member.

JAMES A. EDEN.